United States Patent
Tandler

(10) Patent No.: US 9,200,452 B2
(45) Date of Patent: Dec. 1, 2015

(54) CONTROLLER FOR SKYLIGHT ENERGY MANAGEMENT SYSTEM

(71) Applicant: MBC Ventures, Inc., Baltimore, MD (US)

(72) Inventor: John Joseph Tandler, Arvada, CO (US)

(73) Assignee: MBC VENTURES, INC., Baltimore, MD (US)

( * ) Notice: Subject to any disclaimer, the term of this patent is extended or adjusted under 35 U.S.C. 154(b) by 0 days.

(21) Appl. No.: 14/032,678

(22) Filed: Sep. 20, 2013

(65) Prior Publication Data

US 2014/0165483 A1   Jun. 19, 2014

Related U.S. Application Data

(60) Provisional application No. 61/703,330, filed on Sep. 20, 2012.

(51) Int. Cl.
| | | |
|---|---|---|
| *E04D 13/18* | (2014.01) | |
| *E04D 13/03* | (2006.01) | |
| *E04D 13/035* | (2006.01) | |

(52) U.S. Cl.
CPC ............ *E04D 13/033* (2013.01); *E04D 13/035* (2013.01)

(58) Field of Classification Search
USPC .................. 52/1, 72, 80.1, 200, 204.5, 309.1; 126/569, 583, 585, 587, 621, 623, 683, 126/684, 698, 701, 702, 704, 711
See application file for complete search history.

(56) References Cited

U.S. PATENT DOCUMENTS

| | | |
|---|---|---|
| 2,288,465 A | 6/1942 | Knudsen |
| 2,595,905 A | 5/1952 | Telkes |
| 2,651,085 A | 9/1953 | Kopp |
| 3,077,643 A | 2/1963 | Horner |
| 3,437,818 A | 4/1969 | Shattuck |
| 3,832,853 A | 9/1974 | Butler, Jr. |
| 3,981,445 A | 9/1976 | Custer |
| 3,982,527 A | 9/1976 | Cheng et al. |
| 4,026,269 A | 5/1977 | Stelzer |
| 4,034,736 A | 7/1977 | Telkes |
| 4,106,483 A | 8/1978 | Barber, Jr. |
| 4,127,105 A * | 11/1978 | Watt .............................. 126/636 |
| 4,137,098 A | 1/1979 | Field |
| 4,143,640 A | 3/1979 | Pierce |
| 4,153,038 A | 5/1979 | McDonald |
| 4,153,474 A | 5/1979 | Rex |
| 4,159,707 A | 7/1979 | Miquel |

(Continued)

FOREIGN PATENT DOCUMENTS

| | | |
|---|---|---|
| CN | 2443297 Y | 8/2001 |
| EP | 0371000 | 5/1990 |

(Continued)

*Primary Examiner* — Patrick Maestri
(74) *Attorney, Agent, or Firm* — Whiteford, Taylor & Preston, LLP; Gregory M. Stone

(57) ABSTRACT

A controller for an energy management system that controls the amount of light allowed into an area is provided. The system comprises a louver assembly and a light sensor contained within a light well. The light sensor is in communication with a controller that manages the position of the louvers in the system and controls the amount of light allowed through the system. The system further comprises thermal sensors in communication with the controller, which allow for management of the louvers' position to maximize energy efficiency.

16 Claims, 8 Drawing Sheets

(56) References Cited

U.S. PATENT DOCUMENTS

| | | | |
|---|---|---|---|
| 4,180,414 | A | 12/1979 | Diamond et al. |
| 4,187,123 | A | 2/1980 | Diggs |
| 4,220,137 | A | 9/1980 | Tesch et al. |
| 4,279,240 | A | 7/1981 | Artusy |
| 4,281,488 | A | 8/1981 | Resibois |
| 4,301,787 | A | 11/1981 | Rice |
| 4,308,857 | A | 1/1982 | Sims |
| 4,321,416 | A | 3/1982 | Tennant |
| 4,351,320 | A | 9/1982 | Tetirick |
| 4,401,103 | A | 8/1983 | Thompson |
| 4,410,757 | A | 10/1983 | Stamminger et al. |
| 4,520,794 | A | 6/1985 | Stark et al. |
| 4,567,316 | A | 1/1986 | Hollaus et al. |
| 4,577,619 | A | 3/1986 | Howe, Jr. |
| 4,598,694 | A | 7/1986 | Cromer |
| 4,658,806 | A | 4/1987 | Boozer |
| 4,690,355 | A | 9/1987 | Hornung et al. |
| 4,883,340 | A | 11/1989 | Dominguez |
| 5,115,612 | A | 5/1992 | Newton et al. |
| 5,128,181 | A | 7/1992 | Kunert |
| 5,131,955 | A | 7/1992 | Stern et al. |
| 5,180,441 | A * | 1/1993 | Cornwall et al. ............ 136/246 |
| 5,221,363 | A | 6/1993 | Gillard |
| 5,344,496 | A | 9/1994 | Stern et al. |
| 5,413,161 | A | 5/1995 | Corazzini |
| 5,500,052 | A | 3/1996 | Horiuchi et al. |
| 5,851,309 | A * | 12/1998 | Kousa ............ 136/248 |
| 6,029,656 | A | 2/2000 | Schwarz |
| 6,134,842 | A | 10/2000 | Cheng et al. |
| 6,276,359 | B1 | 8/2001 | Frazier |
| 6,294,725 | B1 | 9/2001 | Hirschberg et al. |
| 6,372,978 | B1 | 4/2002 | Cifaldi |
| 6,528,782 | B1 | 3/2003 | Zhang et al. |
| 6,971,756 | B2 | 12/2005 | Vasylyev et al. |
| 7,352,509 | B2 | 4/2008 | Pagel |
| 7,617,857 | B2 | 11/2009 | Froese |
| 8,156,685 | B2 * | 4/2012 | Kleinwaechter ............ 47/17 |
| 8,430,093 | B1 * | 4/2013 | Harris ............ 126/685 |
| 2003/0000567 | A1 | 1/2003 | Lynn |
| 2003/0038610 | A1 | 2/2003 | Munshi et al. |
| 2003/0168056 | A1 | 9/2003 | Fidler |
| 2005/0109384 | A1 | 5/2005 | Shingleton et al. |
| 2005/0133086 | A1 | 6/2005 | Itoyama et al. |
| 2005/0161074 | A1 | 7/2005 | Garvison et al. |
| 2006/0288645 | A1 | 12/2006 | Konstantino et al. |
| 2007/0034247 | A1 | 2/2007 | Takada et al. |
| 2007/0056579 | A1 | 3/2007 | Straka |
| 2007/0235021 | A1 | 10/2007 | Reed et al. |
| 2008/0029149 | A1 | 2/2008 | Simon |
| 2008/0210293 | A1 | 9/2008 | Reid et al. |
| 2008/0250735 | A1 * | 10/2008 | Patterson ............ 52/200 |
| 2009/0000613 | A1 | 1/2009 | Edwards et al. |
| 2009/0165841 | A1 | 7/2009 | Gunn et al. |
| 2009/0173375 | A1 | 7/2009 | Frazier |
| 2009/0255567 | A1 | 10/2009 | Frolov et al. |
| 2009/0288705 | A1 | 11/2009 | Hiwatashi et al. |
| 2009/0320388 | A1 | 12/2009 | Lilli et al. |
| 2010/0079387 | A1 | 4/2010 | Rosenblatt et al. |
| 2010/0147353 | A1 | 6/2010 | Kamath |
| 2010/0149643 | A1 | 6/2010 | Hooper, Jr. |
| 2011/0120524 | A1 | 5/2011 | Wares et al. |
| 2011/0214712 | A1 | 9/2011 | Frazier |

FOREIGN PATENT DOCUMENTS

| | | |
|---|---|---|
| EP | 1939388 | 7/2008 |
| JP | S54-18762 | 2/1979 |
| JP | 57142444 | 9/1983 |
| JP | 58179771 | 10/1983 |
| JP | S59-119135 | 7/1984 |
| JP | 60120143 | 6/1985 |
| JP | S60-178671 | 9/1985 |
| JP | 05178298 | 7/1993 |
| JP | H11-243225 | 9/1999 |
| JP | 2001-210854 | 8/2001 |
| JP | 2006-046001 | 2/2006 |
| JP | 2006-80462 | 3/2006 |
| JP | 2007231613 | 9/2007 |
| JP | 2008-151490 | 7/2008 |
| WO | 0216707 | 2/2002 |
| WO | 02084182 | 10/2002 |
| WO | 2007030732 | 3/2007 |

* cited by examiner

CONTROLLER FOR SKYLIGHT ENERGY MANAGEMENT SYSTEM

CROSS REFERENCE TO RELATED APPLICATION

This application is based upon and claims benefit of U.S. Provisional Patent Application Ser. No. 61/703,330 entitled "SKYLIGHT ENERGY MANAGEMENT SYSTEM," filed with the U.S. Patent and Trademark Office on Sep. 20, 2012 by the inventor herein, the specification of which is incorporated herein by reference in its entirety.

FIELD OF THE INVENTION

This invention relates to radiant energy management, and more particularly to controllers for use with systems for capturing solar energy to manage illumination and temperature within a defined space.

BACKGROUND OF THE INVENTION

Human thermal comfort is the function of both the air conditions (that is, temperature and air velocity) as well as the radiant environment of the occupants. Alternative types of heating systems, known as radiant heating systems, that use fluid circulated in the floors and/or walls of a building instead of forced hot air are common. Higher floor and/or wall temperatures provide a warm, radiant environment for the occupants which allows the same degree of comfort with a lowered air temperature. Each degree of setpoint temperature reduction can save 2 to 5% of the heat required for a building. In addition, the power required to circulate fluid through tubes in the floor is less than the power required to circulate warm air to deliver the same amount of heat. Further, the circulating air makes the occupant feel colder, negating some of the warming effect.

The most common method of radiant heating, via hydronic fluid circulation, has drawbacks. First, the necessary fluid lines must be embedded in the floor of the space, at significant expense. Retrofit applications of radiant heating are much more expensive, because retrofitting the tubes requires either replacement of the floor, or the addition of a new layer of concrete in which to embed the tubes, which adds further costs and construction complexities. Second, the thermal energy is delivered by conduction through the floor structure, and so the entire mass of the floor must be heated, leading to a large time lag between the initiation of heating from the system and the temperature rise of the floor—typically 30 minutes to one hour. This makes it impossible for the thermal control system to respond to many normal changes in the heating load or changes in the desired temperature of the room. Finally, common floor coverings and furnishings such as rugs, carpets, furniture and cabinets act as insulators to conduction of heat from the floor, which reduces the effectiveness of the heating and further increases the time lag in responding to changes in load and set point. Thus, there remains a need in the art for applications of radiant heating that avoid such disadvantages of previously known systems.

Further, skylight systems have been provided for illuminating a space below a skylight unit. However, there are a number of practical problems regarding the control of illumination levels with current skylight practices. For instance, most existing skylights have no active control elements at all. The control of illumination levels in the space is completely dependent on adjusting the levels of artificial illumination. Further, current skylight systems that use other modulation techniques such as shades or dampers also suffer drawbacks. For instance, modulation consists of reflecting or blocking the undesired levels of light. The excess light is either reflected back to the sky, which causes it to be wasted, or is absorbed by the modulating surface, which can overheat the skylight. Further, modulation by shades or dampers requires either movement of the shade surface by a significant fraction of the cross-section of the skylight area, or a large angle deflection of the dampers. Consequently, for practically sized motors and drive mechanisms, it is impossible to effect changes in the illumination levels in the time scale of less than one second. Still further, none of the existing systems that are known to the inventor herein are self-contained such that the skylight measures its own delivered illumination levels and adjusts its own dampers accordingly. Modulation of the lighting levels is performed by external systems tied into building system controls which increases system cost and complexity. Thus, there remains a need in the art for controlling the amount of illumination provided by skylight systems that may be more easily implemented than previously known systems.

SUMMARY OF THE INVENTION

A skylight module preferably including an energy management system that controls the amount of light allowed into an area is described. In one embodiment, the system comprises a louver assembly and a light sensor contained within a light well. The light sensor is in communication with a controller that manages the position of the louvers in the system and controls the amount of light allowed through the system.

In another embodiment, the system further comprises thermal sensors in communication with the controller, which allow for management of the louvers' position to maximize energy efficiency. The controller is configured to set the louvers' position so that the difference in temperature between the two thermal sensors is as small as possible.

In yet a further embodiment, the system comprises both the light sensor and the heat sensors and the controller is programmed to manage the position of the louvers to maximize light and energy efficiency. In one further embodiment, the system also comprises an occupancy sensor that allows the system to know whether a room is occupied in order to adjust the light requirements and louver positions of the system to maximize energy and light efficiency.

BRIEF DESCRIPTION OF THE DRAWINGS

The numerous advantages of the present invention may be better understood by those skilled in the art by reference to the accompanying drawings in which.

DETAILED DESCRIPTION OF THE PREFERRED EMBODIMENTS

The following description is of a particular embodiment of the invention, set out to enable one to practice an implementation of the invention, and is not intended to limit the preferred embodiment, but to serve as a particular example thereof. Those skilled in the art should appreciate that they may readily use the conception and specific embodiments disclosed as a basis for modifying or designing other methods and systems for carrying out the same purposes of the present invention. Those skilled in the art should also realize that such equivalent assemblies do not depart from the spirit and scope of the invention in its broadest form.

Disclosed herein is a control system suitable for use with skylight assemblies, and particularly with skylight energy management systems as described in copending and co-owned U.S. patent application Ser. No. 13/749,053 titled "Skylight Energy Management System," the specification of which is incorporated herein by reference in its entirety.

The system described herein can deliver radiant heating in the form of light from enhanced aperture skylights. The same heating from skylights that is undesirable in the cooling season can also be put to use in the heating season. One hundred footcandles of lighting provided as daylight is equivalent to 1 W per square foot of heating. The enhanced amount of lighting that is possible with the enhanced aperture modulated daylighting system set forth herein can deliver up to 300 footcandles of light on a bright winter day. This is enough to provide 50 to 100% of the daytime heating load. The heat is delivered at 100% efficiency, and it avoids the disadvantages described above with previously known systems. No modifications are required to the floor or wall structures, there is almost no time lag in the delivery of the heat, and radiant heat from above heats the upper surfaces of furnishings, as opposed to the lower surfaces, which enhances the radiant effect on the occupants. It also lowers the required air temperature in the building to provide the same level of comfort.

In addition to the positive effects of daylighting on productivity for the occupants of a commercial building space, heating with radiant light has additional specific benefits that are realized by the system set forth herein. The negative psychological consequences of the prolonged reduction of natural daylight during winter has been well documented. Seasonal affective disorder (SAD) is a medical condition that is caused by low natural lighting levels over a long period of time such as can occur in mid- to higher latitude regions in winter. Such conditions can be likely ameliorated by exposure to high levels of natural light such as can be achieved with the control system described herein.

Figure 1:
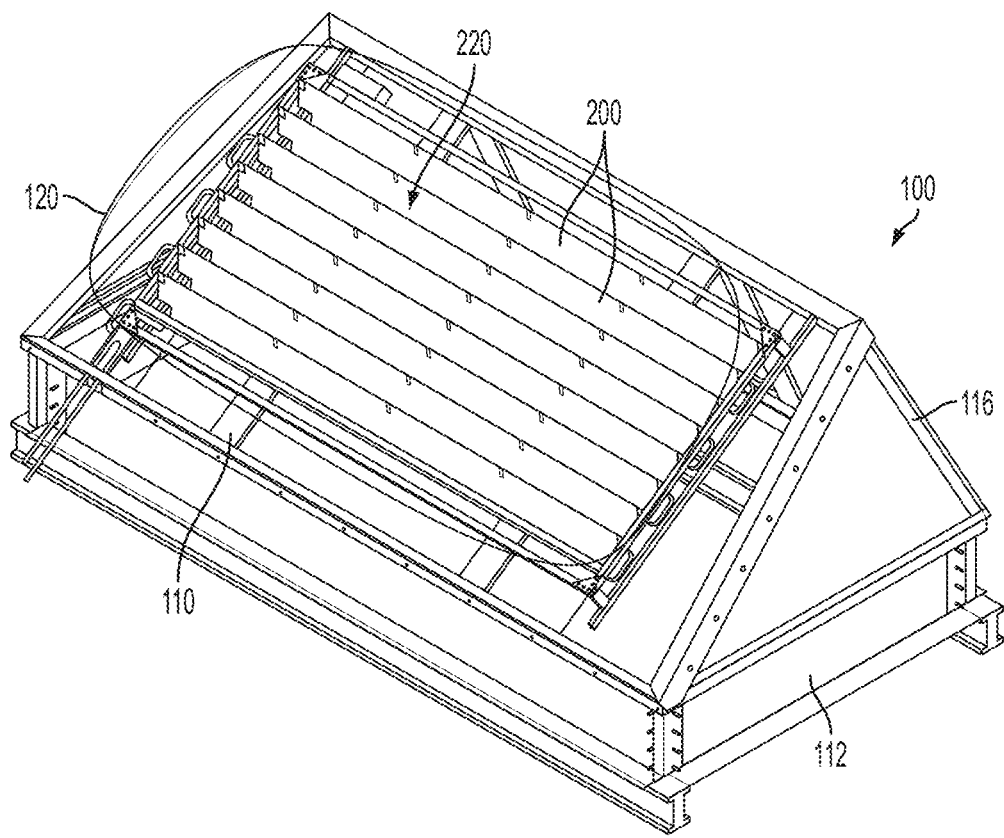
FIG. 1 is a perspective view of the system described herein.

A number of advancements are described herein relating to controls for an energy harvesting skylight. FIG. 1 shows a perspective view of an exemplary skylight module (shown generally at 100) which may incorporate the control system set forth herein. The skylight module 100 is configured for installation in, for instance, the roof of a building, such as a commercial building. The module is configured to provide approximately 50-70 percent more daylighting than standard daylighting solutions, as well as generating thermal heat at temperatures of up to 300 F. This is accomplished by providing a higher skylight to floor ratio (SFR) than typical skylight installations. The larger aperture is used to provide full interior illumination during cloudy, morning and afternoon periods. The solar energy that is in excess of that required for illumination is captured by a single axis micro-concentrating collector embedded in the skylight, making the energy available to offset building thermal loads while relieving the building cooling system of the solar heat load that would be coming through such a large roof opening.

The louvers 200 of a module include a thermal receiver 300 (FIG. 2) on the back of the louvers that is preferably relatively small in size, such that it is possible to have a high degree of focus of the mirror system. A small thermal receiver (as described herein) has a proportionally reduced heat dissipation rate for the same heat input, and thus increases the efficiency of the thermal collection, and consequently increases the peak collection temperatures up to about 220 F. The heat collected from such assembly may be put to various uses, including service water heating, space heating, and some process heat applications including driving single effect absorption chillers for air conditioning.

With particular regard to the skylight energy management system shown in FIG. 1, the system provides the means to seamlessly vary the amount of lighting delivered by each skylight module 100 in real time, with the balance of the solar energy not going into daylighting being captured in the form of thermal heat. Moreover, and again with particular regard to the system shown in FIGS. 1 and 2, louvers 200 may be provided with a thermal receiver 300 that increases the collection temperature to the range of 275 F to 300 F, thus providing more high-value applications of the heat, such as double effect chillers with up to double the cooling value per unit of heat input, and also power generation using organic Rankine cycle or Kalina cycle turbine/generator systems. Alternatively, improving the collection efficiency in the 200-220 F range greatly improves the economics of thermal process heat applications such as single effect chillers. The system shown in FIG. 1 incorporates improved optics which provides a concentration ratio of 10 to 15, resulting in a smaller thermal receiver area and temperatures high enough to drive these higher value loads, and greater efficiency at lower temperatures. Being able to drive loads that provide efficient cooling and power generation vastly expands the number of applications for the system, because many more buildings have need for cooling and power than more application-specific process heat uses.

Figure 2:
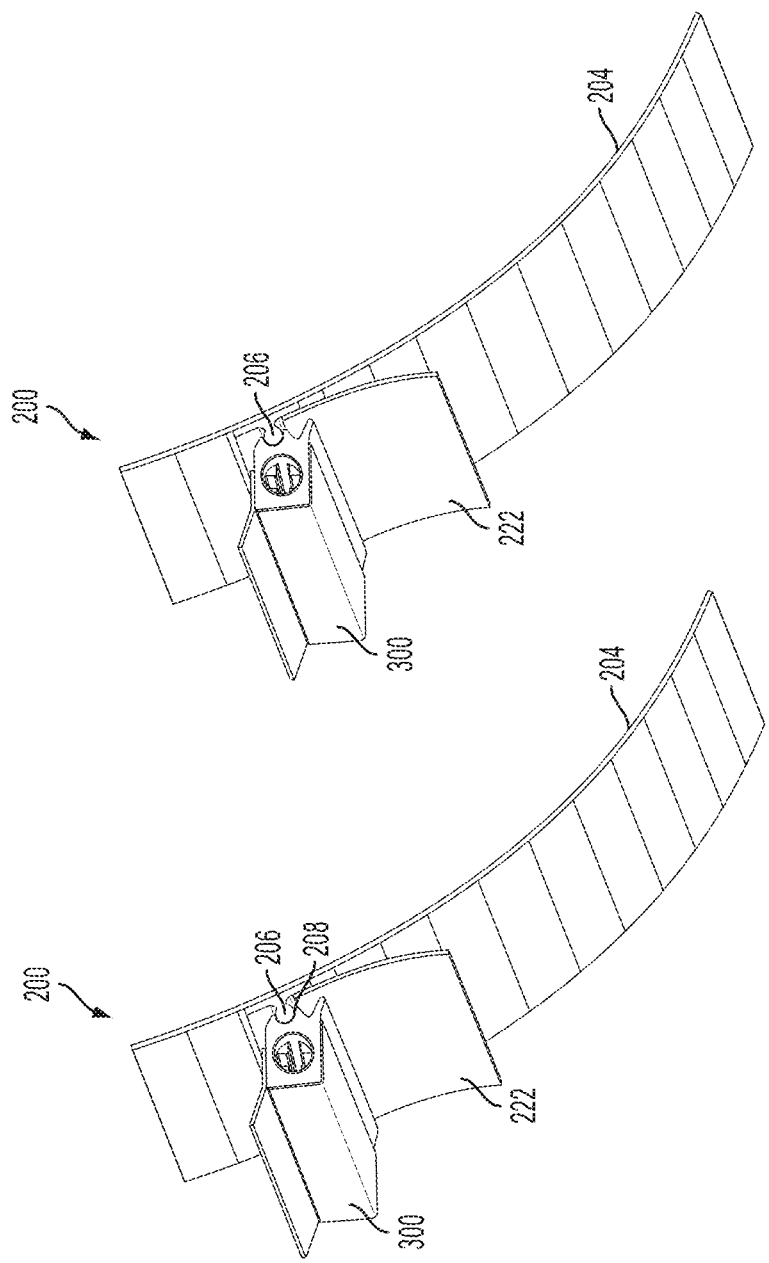
FIG. 2 is a perspective view of two louvers in accordance with one embodiment of the present invention.
Figure 3:
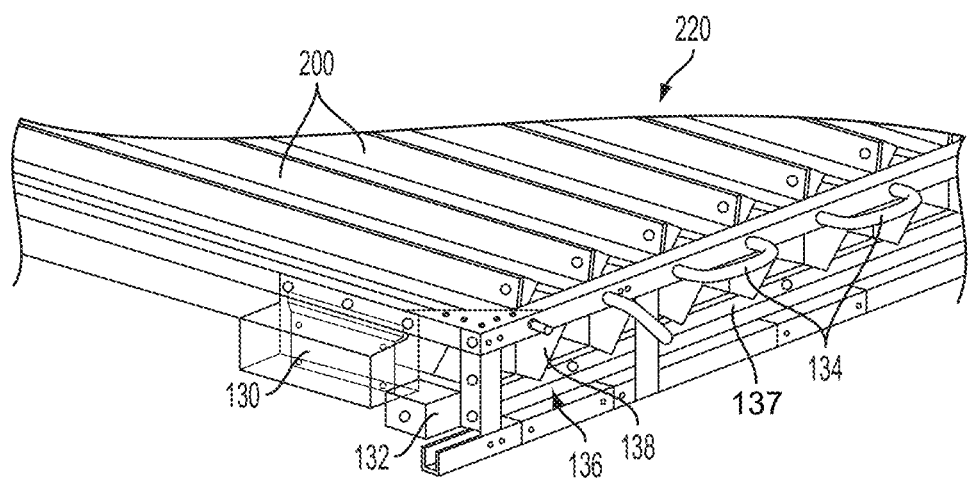
FIG. 3 is a close-up view of the energy conversion module in accordance with one embodiment of the present invention.

With reference to FIGS. 1-3, the monitor 116 (skylight) provides 1) structural support to the energy conversion module/louver assembly 220 (ECM), 2) thermal insulation between inside air and the outside, and 3) direction and diffusion for the light from the sky into the space below. The ECM 220, mounted on the south face of the monitor 116 (assuming the south face is facing the sun), is a micro-concentrating thermal collector and light managing device. A controller board 130 and a small electric stepper motor 132 control the angle of the louvers 200 to deliver the desired amount of light through the ECM 220, while converting the excess light to high grade thermal heat. Fluid lines 134 circulate coolant directly through each louver 200 to pipes located on the roof or in the ceiling space below the skylight modules 100.

Figure 3A:
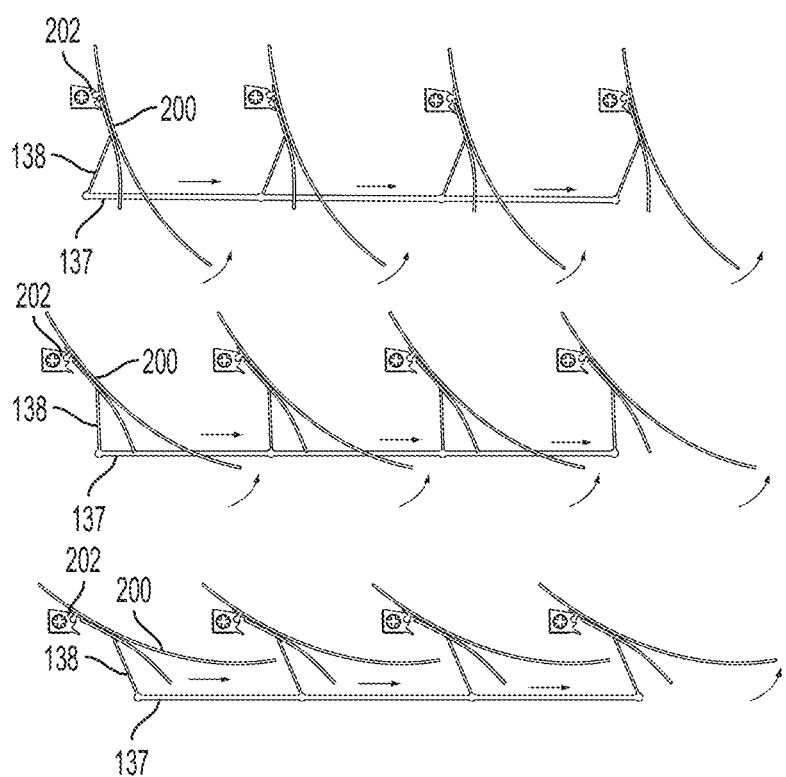
FIG. 3a is a side view of a graphical representation of the energy conversion module in accordance with one embodiment of the present invention.

The louvers 200 are moved by stepper motor 132 and linkage 136 which is located on, for example, the west end of the ECM 220. The controller board 130 is preferably connected to a central control unit and sends commands to the stepper motor 132 which is connected to an actuation bar 137 of linkage 136. The actuation bar 137 is joined to each louver 200 by link arms 138 that connect preferably to the last inch of the west end of the louver 200. The action of the linkage is shown in the schematic views of FIG. 3A with a cross section of four louvers. The actuation bar 137 moves left to right with a small vertical component as the link arms 138 swing in a circular motion as the louver 200 pivots around a slot pivot 202 on the back of each receiver tube. In an exemplary embodiment of the invention, the receiver tubes do not articulate. This allows for fixed fluid connections to the fluid lines 134 that connect the thermal receivers, an improvement from prior designs that required dynamic fluid seals between the receiver tubes and the fixed fluid tubes.

FIG. 2 shows cross sections of two louver sections to show additional detail. The mirror 204 of louver 200 can be either continuously curved or have a faceted shape. The facets are much easier to fabricate with simple sheet bending equipment; the continuously curved design requires custom tooling and high-force hydraulic presses to fabricate. The radius of curvature of the mirror 204 varies along its length to optimize the focusing of light on the thermal receiver 300 and secondary reflecting surfaces (described in greater detail below). The portion of the mirror 204 near the top is generally farther away from the adjacent receiver/reflector surfaces and so requires a larger radius of curvature (less curved shape). The portion of the mirror 204 near the bottom is generally presented with a shorter distance to the adjacent receiver and so requires a smaller radius of curvature to focus the light. In an exemplary embodiment of the invention, the mirror 204 is attached to a pivot bar 206 that runs the length of the mirror 204 (or alternatively may consist of short sections to reduce thermal conductivity and losses). The pivot bar 206 has a linear bulb that fits into a slot 208 on the back of the receiver tube 300 to provide a pivot point for rotation. It is important to minimize the thermal conductivity between the hot receiver tube 300 and the mirrors 204 to keep the mirrors 204 from becoming cooling fins. Therefore, the pivot bar 206 is preferably attached to the mirror 204 with silicone foam tape which has a low thermal conductivity but can withstand the high temperatures of the thermal receiver 300. In addition, the outer surface of the linear bulb may be coated with Teflon or other high-temperature insulating plastic to minimize thermal conduction from the thermal receiver tube 300 to the pivot bar 206.

As best shown in FIG. 2, and again in accordance with an exemplary embodiment of the invention, also attached to the pivot bar 206 is the reflecting diffuser 222. The reflecting diffuser 222 directs the rays of sunlight that strike it into the space below. The reflecting diffuser 222 (as well as the secondary mirror on the thermal receiver tube 300, discussed below) is made of specialty lighting reflector sheet that is partially specular and partially diffuse. Such specialty lighting reflector sheet material is readily commercially available, and may comprise, by way of non-limiting example, ALANOD 610G3 available from ALANOD GMBH & CO. KG, or ACA 420AE/DG available from ALUMINUM COIL ANODIZING CORP. The material reflects incoming light rays into a 20 degree cone which provides more diffuse projection into the space below while maintaining the directionality of the light. A purely diffuse reflector, such as a white painted surface, while providing soft light to the space below, would waste light by reflecting some of it back towards the primary mirror. A purely specular reflector, such as a polished reflector, would direct all of the light efficiently into the space, but would require secondary conditioning to avoid harsh glare spots. The shape of the reflecting diffuser 222 can either be curved, as shown in FIG. 2, or straight. The main criteria in configuring the reflecting diffuser 222 is that the reflecting diffuser intercept preferably all light rays that come from the primary mirror 204 at the shallow angle so that they do not get re-reflected back to the primary mirror 204 and lost.

Figure 4:
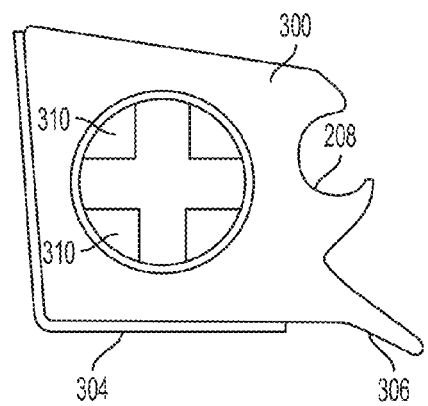
FIG. 4 is a side view of a thermal receiver in accordance with one embodiment of the present invention.
Figure 5:
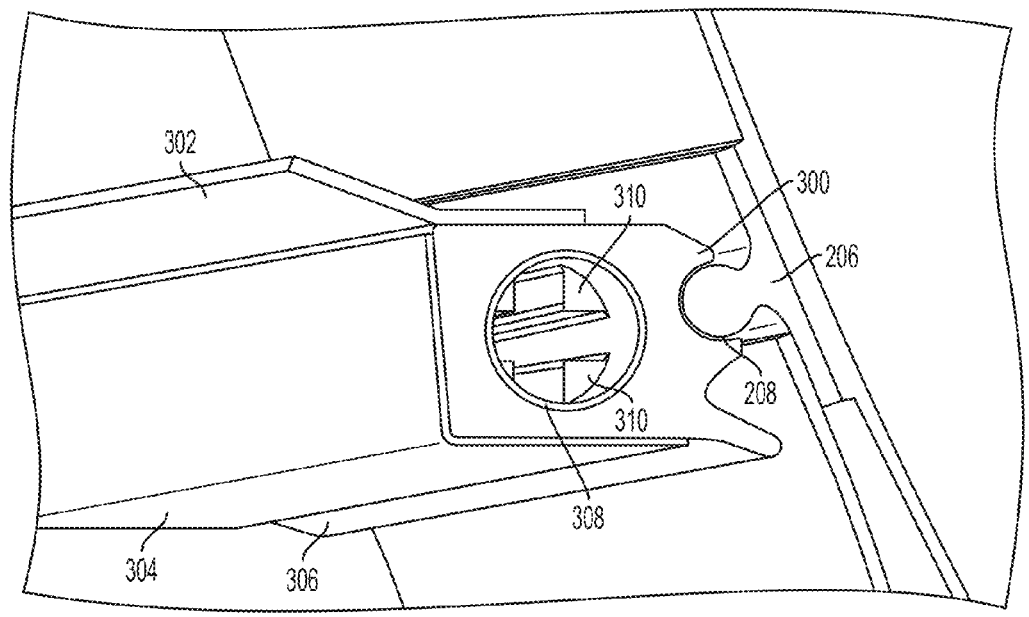
FIG. 5 is a perspective view of a thermal receiver in accordance with one embodiment of the present invention.

The details of the thermal receiver tube 300 in accordance with such exemplary embodiment are displayed in the cross-sectional views of FIGS. 4 and 5. The main body of the thermal receiver 300 is preferably formed of extruded aluminum. To the base extrusion, three features are attached using high-temperature epoxy adhesives: a thermal baffle 302, a thermal collector 304, and a secondary mirror 306. The operation and further details of such assembly are set forth in full in U.S. Patent Application Publication No. US2013/0199515, and are thus not discussed further here.

Figure 6:
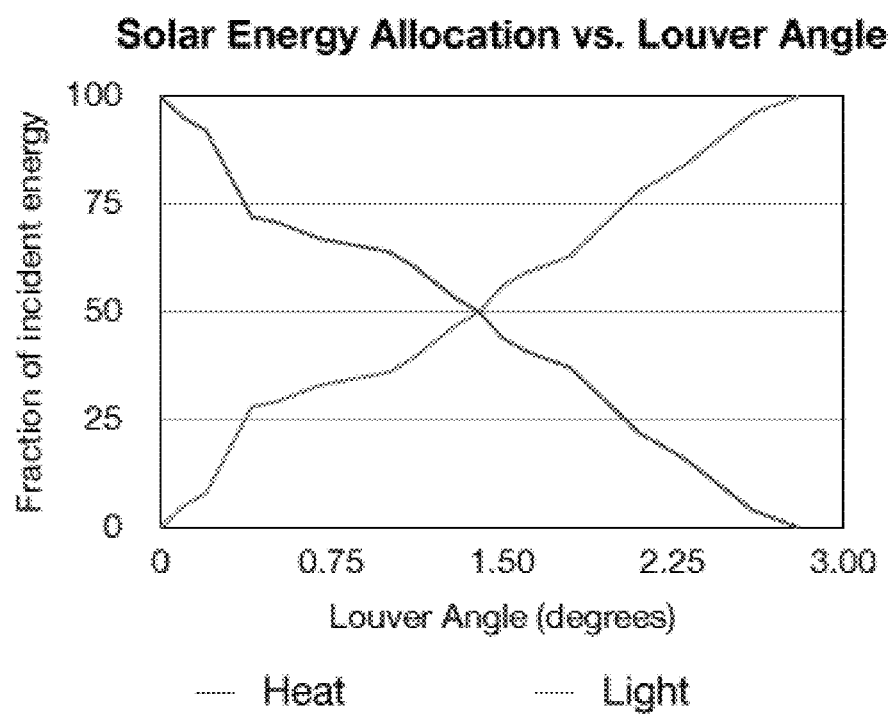
FIG. 6 is a graphical representation of the louver action as a fraction of incident energy and heat.

Light exiting from the bottom of the skylight module 100 is sensed using low-cost light sensors that feedback into the controller board 130 mounted in each skylight module 100. The optics are designed such that at every sun angle, the amount of light that comes through the energy conversion assembly 220 is a monotonic function of the angle of louvers 200. That is, moving the louvers 200 at an angle more open to the sky always increases the amount of light coming through, and moving the louvers 200 to an angle more closed to the sky always reduces the amount of light coming through. Therefore, a simple proportional integral control loop can be employed by controller board 130 to keep the light levels at a desired set point. Secondly, the excess light is captured for useful thermal energy. Finally, and with reference to the chart of solar energy allocation versus louver angle depicted in FIG. 6, because of the degree of concentration of the optics, the fraction of incident direct solar energy that is converted into illumination goes from 0 to 100% in a louver deflection of less than 3°. This very small deflection can be executed in less than one second, such that the bandwidth of the lighting control can be faster than the disturbances, such as varying sunlight levels. Because of this, the skylight optics combined with a moderately sized motor 132 and electronics processing power of controller board 130 can maintain a very precisely controlled and constant amount of illumination into the space below.

This precise control of illumination coming from the skylight module 100 can be used to effect a number of efficiencies and functional enhancements. For instance, in many retail environments such as grocery stores, illumination levels are precisely controlled in order to present merchandise in the best light. Different kinds of merchandise such as produce or dry goods are presented at different lighting levels which have been found to produce optimal sales results. By using skylight modules 100 to maintain a precisely controlled illumination level throughout the day even under varying sky conditions, the inventive energy managing skylight described herein can provide these precise lighting levels with no artificial illumination. It is even possible to vary these control lighting levels as a function of the time of day. For interior spaces that are only intermittently occupied, it is possible to place an occupancy sensor at the base of each skylight module 100. When the sensor does not detect the presence of occupants, it can be programmed to deliver no illumination and maximize the amount of thermal heat collected. When the sensor detects an occupant, the lighting levels can be raised to the required illumination level faster than the time it takes for many commercial lighting fixtures to turn on.

Because each skylight module 100 has its own intelligent controller board 130, it is a very low cost option (e.g., $20) to add a wireless communication module that can directly control the light fixtures in the vicinity of the module that have a similar low-cost (e.g., $50) wireless receiver. The lighting controls can either be on/off, or modulating which provides a continuously dimmable output of the associated lighting fixtures. This has a number of advantages compared to the current state-of-the-art. Current state-of-the-art in automatic daylight harvesting systems for flat roof commercial buildings is to install an array of sensors 5 to 10 feet above the floor of the space. The sensors measure the total illumination reaching the floor from both the skylights and the artificial lighting. This information is fed back to a central controller, and the artificial lighting is either turned on or off or dimmed to reach the desired setpoint. Combining the control logic for both the skylight module 100 and the artificial light illumination levels in the skylight module 100 itself has several advantages. First, for periods of time when the skylight modules 100 are providing more than the desired lighting levels, the controller can attenuate the amount of light coming from the skylight module 100. Second, because the skylight module 100 has a knowledge of the amount of light that it is putting out, the array of sensors near the floor of the space is unnecessary. Finally, there are a number of factors that can confuse a floor illumination sensor. The sensor is generally incapable of distinguishing light which is coming from the skylights, the artificial lights, or reflected light. Objects which pass temporarily through the field of view of the sensor which might for example reflect additional light onto the sensor would cause the lighting in that zone to be dimmed unnecessarily, causing a dark zone. The light sensors employed in the system described herein are in the light well of the skylight, and are thus not susceptible to such disturbances. The "light well" is the space that exists between the bottom plane of the skylight module 100 and the open area at the bottom of the roof curb to which the skylight module 100 is attached for mounting to a roof.

Figure 7:
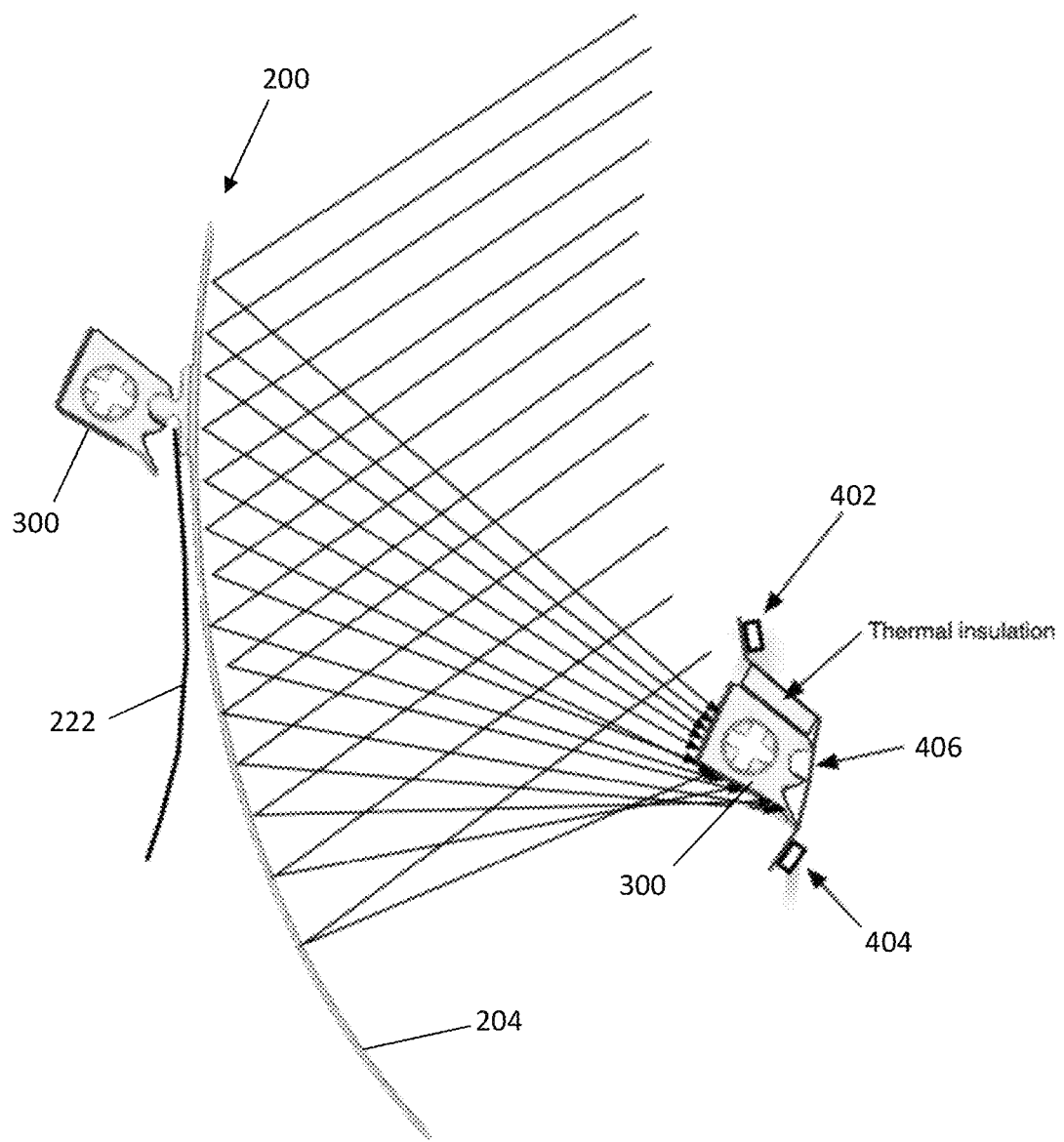
FIG. 7 is a representation of the trajectory of light reflected from one louver to another in one embodiment of the present invention.

When the system controller is calling for very low or zero illumination levels, the controller cannot use light sensors as feedback to determine the optimal louver position. FIG. 7 shows the light path for a louver 200 that is delivering 100% heat and no illumination. It is desired that all of the incoming light be projected onto the two thermal absorbing surfaces. Previous versions of the energy managing skylight product used open loop control in which the optimal angle was calculated based on time of day location and orientation of the module. While conceptually a low-cost approach, a significant amount of programming is required to set up the tables which determine the optimal angles for each installation. A system that uses purely feedback control requires little or no upfront programming and is more robust in the presence of disturbances in the field.

In general, it is difficult for a control loop designed to maximize the controlled variable to use the controlled variable directly as feedback because when the system is actually producing at its maximum value, there is no error signal to feedback to the controller. It is necessary to "dither" the signal by intentionally introducing disturbances by perturbing the system from its optimal setting. In systems with a significant amount of time lag between errors in input and output, this dithering technique is difficult to employ. The significant thermal mass of the receiver does produce a significant time lag between the presence of errors in pointing and changes in the temperature of the tube. Also, an issue is the fact that the temperature of the tube is also a function of the temperature of the fluid going through it. Changes in the incoming fluid temperature due to changes in other parts of the system could therefore confuse a feedback controller based on the receiver to temperature.

For these reasons, it is preferred to measure and minimize the "spilled" or lost energy, not the captured energy. One approach to measuring the spilled energy is to directly measure the light using a light sensor near the receiver tube. A sensor that measures the amount of concentrated light falling onto the surface would be difficult to use because the focused light is concentrated by a factor of 10 to 15 and saturation or overheating of the light sensor is hard to avoid.

Thus, an approach using two temperature sensors to control thermal heat collection, which addresses all of these issues, is shown in FIG. 7. Two temperature sensors 402 and 404 are mounted on a sensor bracket 406 which is attached to one of the receiver tubes 300 (because all of the mirrors move in concert, it is only necessary to instrument one of the tubes). The sensor bracket 406 is placed in such a position that is completely shadowed by the adjacent mirror so that no direct sunlight strikes the bracket. The sensor bracket is made of a thin metal sheet which is thermally isolated from the receiver tube 300 upon which it is mounted. The thermal insulation 408 is important to decouple the temperature sensors 402 and 404 from both the thermal lag of the receiver tube 300 to, and the temperature disturbances coming from, the fluid itself. The face of the sensor bracket 406 that faces the concentrated light is painted a medium gray color with a light absorbance factor of about 0.3. If the mirror 204 is perfectly focused and all of the light is falling on the receiver tube 300, the temperature of the upper and lower temperature sensors 402 and 404 will be equal. As the sun moves across the sky or something else causes an error in the pointing, some of the concentrated light will either spill high or low from the receiver tube 300. The light that then strikes either the upper or lower region of the bracket 406 will cause a differential heating of the bracket 406 in that area. If the bracket 406 is sufficiently thin, there will be a negligible amount of heat conduction between the two ends of the bracket 406. Temperature sensors 402 and 404 mounted on the opposite side of the bracket 406 will then measure this differential in temperature and generate a signal to the controller proportional to the difference in temperature in a direction which drives the temperature differential to zero. The sensor that is receiving no stray light will be at the ambient temperature inside the skylight module 100. The other sensor, which is receiving stray light, will be at a temperature that is proportional to the amount of light striking it and the optical reflectivity of the bracket 406. Therefore, the temperature that the sensors reach, and therefore the gain of the controller, can be controlled by essentially the color of the bracket 406. Because the controller only looks at the temperature difference between the two sensors 402 and 404, and not the absolute temperature, it is insensitive to common mode disturbances such as ambient temperature variations. To compensate for errors in the calibration of each sensor 402 and 404, the temperature of the two sensors can be sampled at nighttime when there is no solar energy present to drive a temperature difference. The static temperature difference between the two sensors 402 and 404 can then be taken out of the calculation for feedback control.

Figure 8:
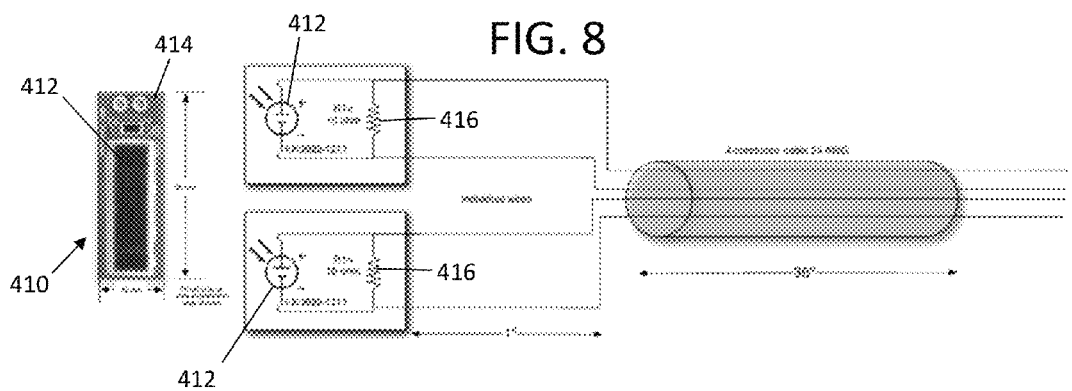
FIG. 8 is an electrical diagram of the configuration of a heat sensor for controlling heat collection in accordance with one embodiment of the present invention.

An alternative sensor configuration for controlling thermal heat collection is shown in FIG. 8. A possible drawback of using temperature sensors to determine the position of the light beam is the time lag between the impingement of the light on the absorber and the increase in temperature sensor. An alternative approach is to use a sensor 410 (FIG. 8) that measures the light beam directly. The concentration of the light striking the thermal absorber and consequently the spillover light sensor can be as high as 7 to 10 times ordinary sunlight. Light sensors to measure this level of flux are not commercially available. A light sensor 410 as shown in FIG.

8 is able to operate in the extreme temperature and illumination environment required for this sensor.

Figure 9:
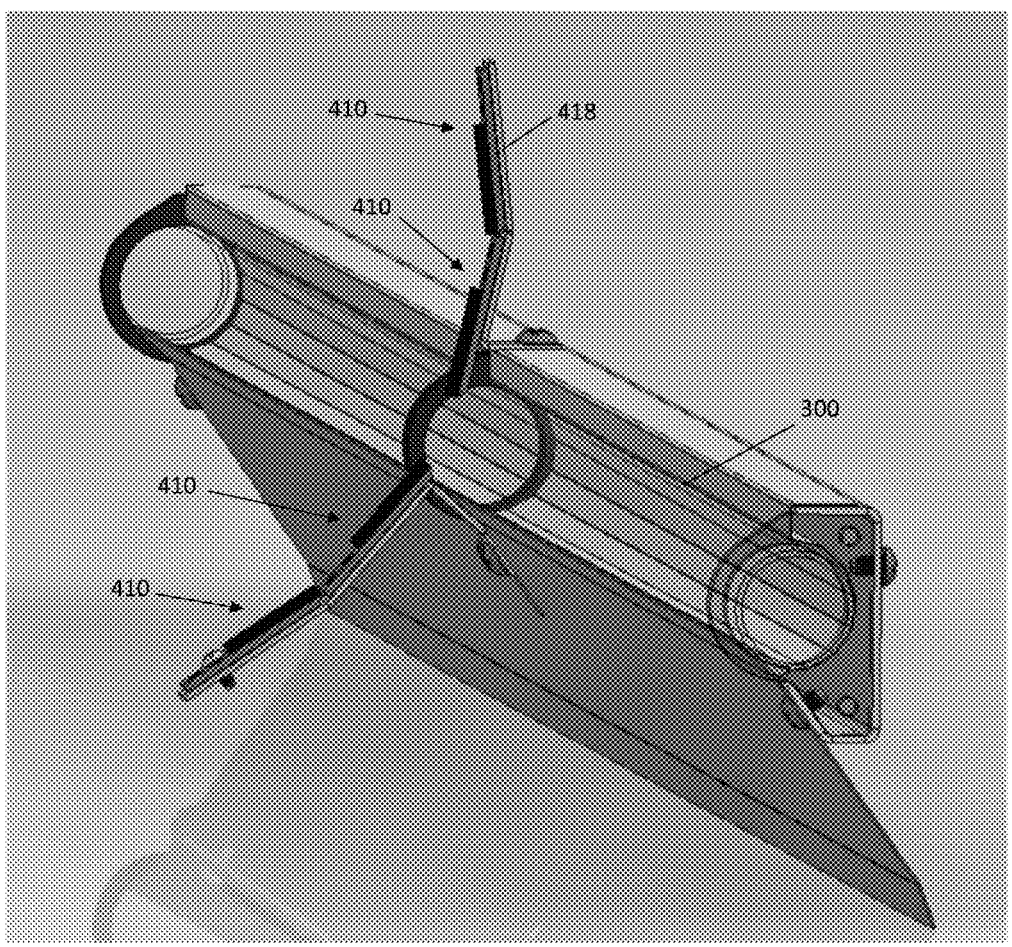
FIG. 9 is a perspective view of an alternative configuration of heat sensors on the louver in accordance with another embodiment of the present invention.
Figure 10:
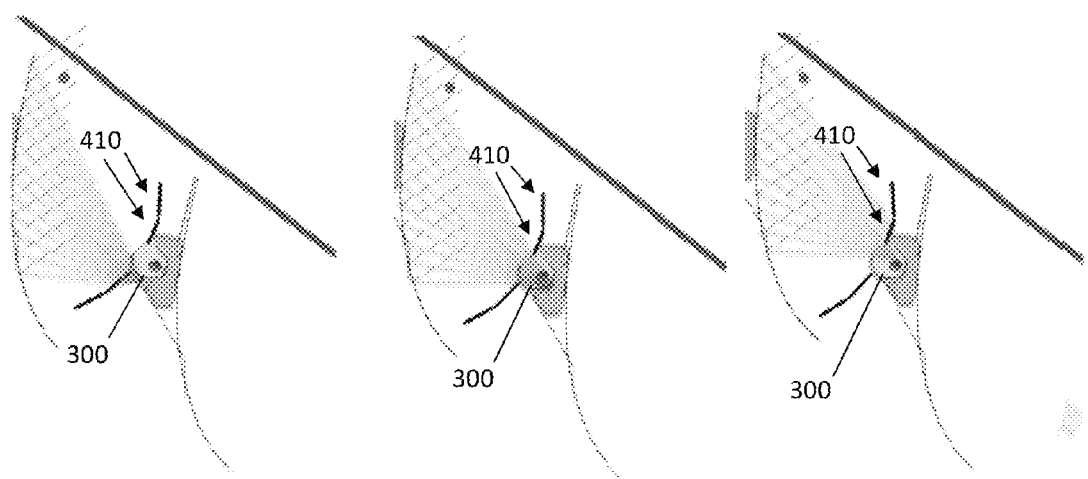
FIG. 10 is a side view showing the reflection of light in an alternative configuration in accordance with one embodiment of the present invention.

With continued reference to FIG. 8, a photovoltaic cell 412 is mounted on a small circuit board 414 with a shunt resistor 416. The shunt resistor 416 dissipates the power generated by the PV cell 412, and the voltage across the resistor 416 is directly proportional to the total light energy striking the sensor 410 over a wide range. Two sensors 410 can be put in series to accurately determine the total light flux high or low of the thermal absorber 304. Silicone based photovoltaic cells are able to withstand temperatures as high as 180° F. and so are most suitable for this application. As shown in FIGS. 9 and 10, the two sensors 410 in series may be attached to a bracket 418 that in turn is attached to receiver tube 300, reaching above and below the thermal absorber 304, can thus provide immediate and accurate feedback to the controller for any louver and sun position (FIG. 10 showing the impact of various sun angles on an array of sensors 410).

Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. It should be understood, therefore, that the invention may be practiced otherwise than as specifically set forth herein.

What is claimed is:

1. A skylight module comprising:
   a monitor;
   a louver assembly within the monitor comprising
      a first louver having a front side,
      a second louver having a back side and positioned adjacent said first louver such that said back side of said second louver faces said front side of said first louver,
      a receiver tube attached to said back side of said second louver, said receiver tube having an outer surface comprising a thermal collector, and an interior fluid channel, and
      a reflecting diffuser attached to said back side of said second louver and configured to reflect and diffuse light received in said monitor into a space below said skylight module;
   a light sensor within a light well in the monitor; and
   a controller connected to the light sensor, wherein the controller changes the first and second louver's position to control the amount of light allowed through the system based on light information captured by the light sensor.

2. The skylight module of claim 1, further comprising two thermal sensors.

3. The skylight module of claim 2, wherein the thermal sensors are attached to an exterior of said receiver tube.

4. The skylight module of claim 2, wherein the thermal sensors are connected to the controller, and wherein said controller is configured to adjust the louvers' position in order to minimize the difference in temperature between the two thermal sensors.

5. The skylight module of claim 1, wherein the controller is further configured to directly control artificial lighting in a building in which said skylight module is installed.

6. The skylight module of claim 1, further comprising:
   at least two thermal sensors;
   wherein the two thermal sensors are encased in said monitor, wherein the thermal sensors are connected to the controller, and wherein the controller is configured to change the louver's position based on information received from both the light sensor and the thermal sensor so as to at least reduce an amount of light impacting said thermal sensors.

7. The skylight module of claim 6, wherein the two thermal sensors are attached to a louver.

8. The skylight module of claim 7, wherein the controller is further configured to adjust the louvers' position in order to minimize the difference in temperature between the two thermal sensors.

9. The skylight module of claim 6, wherein the controller is further configured to directly control artificial lighting in a building in which said skylight module is installed.

10. The skylight module of claim 1, further comprising:
    at least two thermal sensors attached to at least one of said louvers;
    wherein the thermal sensors are connected to the controller, and wherein the controller is configured to change the louver's position based on information received from at least said thermal sensors so as to reduce an amount of light impacting said thermal sensors to minimize a difference in temperature between the two thermal sensors.

11. The skylight module of claim 10, wherein the controller is further configured to directly control artificial lighting in a building in which said skylight module is installed.

12. A skylight module comprising:
    a monitor;
    a louver assembly within the monitor comprising
       a first louver having a front side,
       a second louver having a back side and positioned adjacent said first louver such that said back side of said second louver faces said front side of said first louver,
       a receiver tube attached to said back side of said second louver, said receiver tube having an outer surface comprising a thermal collector, and an interior fluid channel, and
       a reflecting diffuser attached to said back side of said second louver;
       wherein said first louver and said second louver are positioned with respect to one another so that light reflected from said first louver impacts said thermal collector on said second louver, and so that additional light reflected from said first louver impacts said reflecting diffuser on said second louver, and wherein said reflecting diffuser is configured to reflect and diffuse said additional light into a space below said skylight module;
    a light sensor within a light well in the monitor; and
    a controller connected to the light sensor, wherein the controller changes the first and second louver's position to control the amount of light allowed through the system based on light information captured by the light sensor.

13. The skylight module of claim 12, further comprising two thermal sensors.

14. The skylight module of claim 13, wherein the thermal sensors are attached to an exterior of said receiver tube.

15. The skylight module of claim 13, wherein the thermal sensors are connected to the controller, and wherein said controller is configured to adjust the louver's position in order to minimize the difference in temperature between the two thermal sensors.

16. The skylight module of claim 12, wherein the controller is further configured to manage artificial lighting in a building in which said skylight module is installed.

* * * * *